United States Patent [19]
Desai

[11] Patent Number: 5,328,780
[45] Date of Patent: Jul. 12, 1994

[54] METHOD FOR CONTROLLING CORROSION ON A BATTERY WITH FRACTIONALLY SIZED TERMINALS

[75] Inventor: Venus D. Desai, Plantation, Fla.

[73] Assignee: Motorola, Inc., Schaumburg, Ill.

[21] Appl. No.: 150,562

[22] Filed: Nov. 10, 1993

Related U.S. Application Data

[63] Continuation of Ser. No. 4,206, Jan. 13, 1993, abandoned, which is a continuation of Ser. No. 807,361, Dec. 16, 1991, abandoned.

[51] Int. Cl.$^5$ .................. H01M 2/10; H01M 2/30
[52] U.S. Cl. .................................. 429/65; 429/1; 429/99; 429/100; 429/178
[58] Field of Search .................. 429/1, 8, 178, 179, 429/48, 65, 96, 97, 99, 100

[56] References Cited

U.S. PATENT DOCUMENTS

| | | | |
|---|---|---|---|
| 2,478,887 | 8/1949 | Nelson | 429/1 |
| 3,992,225 | 11/1976 | Sykes | 429/1 |
| 4,184,007 | 1/1980 | Urry | 429/178 X |
| 4,425,414 | 1/1984 | Solomon | 429/178 X |
| 4,578,628 | 3/1986 | Siwiak | 429/97 X |
| 5,260,146 | 11/1993 | Savovic et al. | 429/65 |

FOREIGN PATENT DOCUMENTS 2032166 4/1980 United Kingdom .................. 429/1

*Primary Examiner*—John S. Maples
*Attorney, Agent, or Firm*—Dale W. Dorinski

[57] ABSTRACT

A battery comprises a battery cell (110) having positive (160) and negative (140) electrical terminals. The terminals are electrically coupled to the battery cell and situated on an external surface (120) of the battery cell. The exposed surface area of the positive terminal is greater than the exposed surface area of the negative terminal, thereby reducing the corrosion of the battery electrical terminals. A plurality of cells is also configured to form a cathodically protected multicell battery package for use in a corrosive environment. The multicell battery (200) comprises a battery housing (210) and a plurality of cells (250-300) within the housing. The cells are electrically coupled together so as to terminate in positive and negative electrical contacts (221 and 222) on the exterior (220) of the battery housing. The positive and negative terminals of the cells are connected to these contacts, and formed so that the ratio of the areas of the positive/negative contacts is greater than unity.

11 Claims, 4 Drawing Sheets

5,328,780

METHOD FOR CONTROLLING CORROSION ON A BATTERY WITH FRACTIONALLY SIZED TERMINALS

This is a continuation of application Ser. No. 08/004,206, filed Jan. 13, 1993, now abandoned, which is a continuation of Ser. No. 07/807,361 filed Dc. 16, 1991, and now abandoned.

TECHNICAL FIELD

This invention relates generally to a battery for energizing electrical and electronic equipment and more particularly to batteries having fractional sized contacts.

BACKGROUND

Corrosion is the destructive attack of a metal by chemical or electrochemical reaction with its environment. In some instances, chemical attack accompanies physical deterioration and results in corrosive wear. Corrosion in electrical or electronic devices is particularly harmful since these types of devices are very susceptible to performance deterioration when any of the electrical components corrode. Corrosion prevention stems from economic, safety, and conservation concerns. With respect to electronic products, economics and safety are the prime factors in motivating corrosion prevention research.

Battery powered electrical devices typically have electrical contacts where a replaceable battery may be connected to the device. Likewise, the battery intended for attachment to and for energizing the electrical equipment necessarily must have battery terminals which are intended to mate with the corresponding terminals of the electrical equipment. These contacts or terminals of the battery and the electrical equipment are exposed when the battery or battery pack is separated from the equipment portion which it powers and also when the battery or battery pack is connected to the electrical equipment. When the battery powered electrical equipment is used in a corrosive environment, such as that experienced near coastlines, electrochemical corrosion of the battery terminals results.

There have been attempts in the past to solve this problem. One of these attempts involves environmentally sealing or isolating the electrical contacts of the battery and the electrical device from the corrosive environment. This provides a solution only while the battery is connected to the electrical device, leaving the problem of corrosion during the time when the battery is removed from the device. Also, any violation of the integrity of the environmental seal will result in corrosion of the battery terminals.

Another attempt to solve this problem has been to use noble metals as the contact surfaces of the battery terminals and the electrical device supply terminals. Plating the contacts with material such as gold, platinum or silver does eliminate corrosion in marine environments, however, this is an expensive solution to the problem and the noble metal plating eventually wears away, thereby exposing the underlying metal to possible corrosion.

What is needed then, is a method of eliminating the corrosion of battery terminals in marine environments that does not require expensive noble metal plating or complicated environmental sealing mechanisms.

SUMMARY OF THE INVENTION

Briefly, according to the invention, there is provided a battery comprising a battery cell having positive and negative electrical terminals. The positive terminal has an exposed surface area between about 1.1 and about 10 times greater than the exposed surface area of the negative terminal, thereby reducing the corrosion of the battery terminals.

In an alternate embodiment of the invention, a multi-cell battery package is created for use in a corrosive environment. The multicell battery comprises a battery housing and a plurality of cells within the housing. The cells are electrically coupled together and to positive and negative contacts on the exterior of the battery housing. The exposed surface area of the positive electrical contact is greater than the exposed surface area of the negative electrical contact.

In another embodiment of the invention, a battery-powered electrical device is contained within a housing along with a battery power source. The battery power source has positive and a negative terminals, the positive terminal having an exposed surface area between about 1.1 and about 10 times greater than the exposed surface area of the negative terminal. The battery power source is electrically coupled to the electrical device.

In still another embodiment of the invention, a battery-powered communications device is provided for use in a corrosive environment comprising a communications device and a battery package. The battery package contains a plurality of cells and electrical contacts. The electrical contacts are situated on the external surface of the battery package and coupled to the cells. The exposed surface area of the positive electrical contact is between about 1.1 and about 10 times greater than the exposed surface area of the negative electrical contact. The communications device and the battery package are configured to detachably interconnect by using sets of battery contacts and power supply terminals.

DETAILED DESCRIPTION OF THE PREFERRED EMBODIMENT

Corrosion processes are most often electrochemical. Metal surfaces are prone to a phenomenon called local action current, where impurities in the metal surface serve to form a portion of a galvanic cell. So long as the metal remains dry, local action current and corrosion are not observed, but on exposure of the metal to aqueous solutions, the local action current causes chemical conversion of the metal to corrosion products. This phenomenon accounts for the corrosion of metals exposed to water, salt solutions, acids, or alkalis.

The composition and manufacture of batteries is well known to those skilled in the art. A battery is a direct-current voltage source made up of one or more units that convert chemical, thermal, nuclear, or solar energy into electrical energy. The output voltage of a battery is a function of the makeup of the battery, for example, in a conventional alkaline battery, the output voltage is about 1.5 volts, which is dependent on the chemistry of the electrochemical cell within the battery. A nickel-cadmium rechargeable battery has somewhat different cell chemistry, and as a result, has an output voltage of about 1.2 volts. Lithium batteries, having still different chemistry, have still another voltage level. The units that form a battery are normally referred to as cells. It should be understood that a battery can be a single cell entity, or it can be composed of a plurality of cells electrically connected together in series, parallel, or some combination thereof. A battery power source or battery package is likewise composed of one or more batteries or units. By connecting the individual batteries is appropriate configurations, the voltage and current of the completed battery can be increased to the desired level, for example a six volt battery is made by connecting four batteries in series, a nine volt battery is made by connecting six batteries in series, etc. The concept hereinafter disclosed may be applied to batteries having a single battery or a plurality of batteries.

Figure 1:
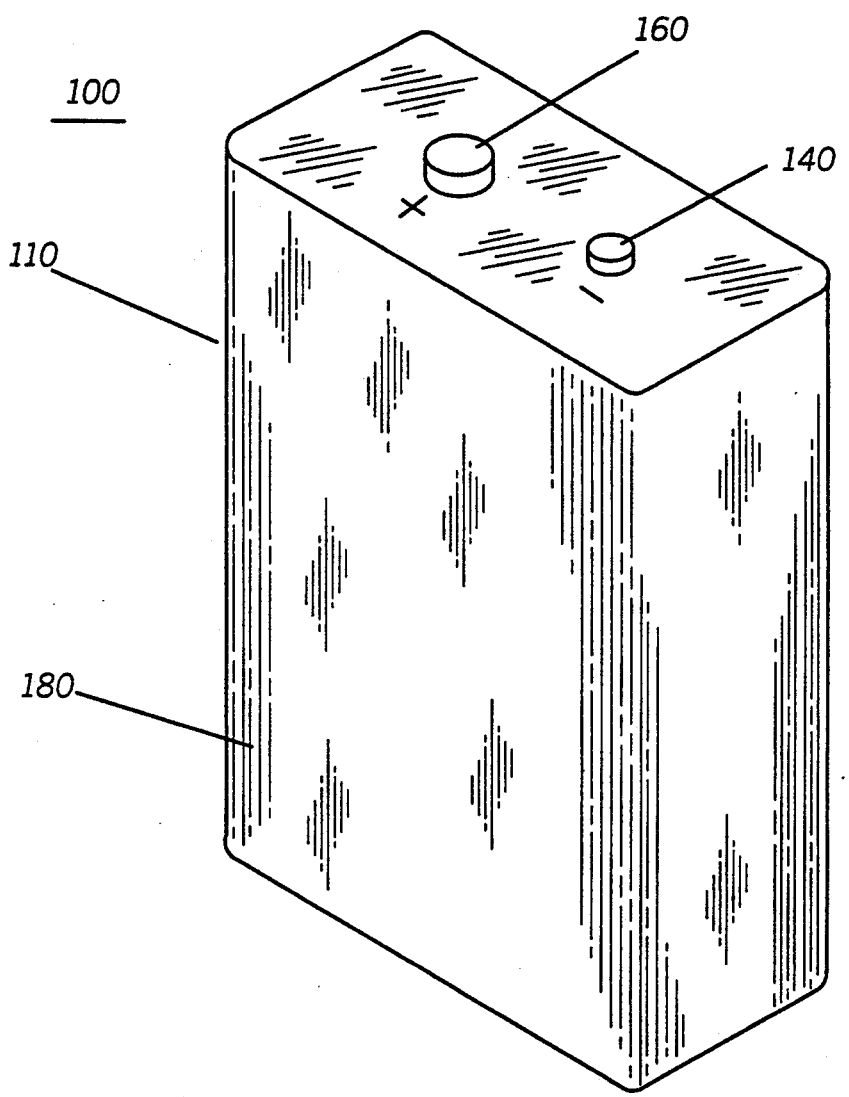
FIG. 1 is an isometric view of a battery cell in accordance with the invention.

Referring now FIG. 1, a cathodically protected battery 100, for example, a nine volt battery is formed. In addition to a negative electrode 140, typically on the top of the battery cell 110, a positive electrode 160 is also situated on the top of the battery cell 110. The size of the positive electrode 160 is greater than the size of the negative electrode 140. The reader will note that the negative terminal 140 is not directly connected to the positive terminal 160 by means of a liquid electrical connection. A battery made in accordance with the invention, when used in a moist or corrosive environment, will have electrical coupling between the positive and negative electrodes provided by vapors of moist air or as condensation of the vapors in the cell operating environment. This forms at least a monolayer of moisture on the battery surface, serving to electrically couple the electrodes to each other. The moist air, while not as good a conductor as a solution, serves to provide a certain minimum amount of connection between the battery contacts 140 and 160. In coastal areas, where the moist air is also composed of salt from sea water, a more efficient electrochemical cell is set up.

An electrochemical cell is a vessel or container containing electrolyte solutions and electrodes to produce an electric current. In conventional electrochemical cells where the electrodes are immersed in a conducting liquid, the reduction of $H^+$ at a cathode is accompanied by the simultaneous reverse reaction at a lower rate for $H_2$ oxidizing to $H^+$. These oxidation and reduction reactions have been assumed to take place on the same surface sites, and at equilibrium, the forward and reverse reactions were assumed to be equal, along with the current density. In a corroding situation, however, the anode and cathode reactions are distinct and different, and do not occur on the same surface site. One is not merely the reverse reaction of the other, hence the oxidation reaction can only take place on those sites of the metal surface that are different and distinct from those where reduction takes place. Those with ordinary skill in the art have known that varying the distance from the anode to cathode will affect the corrosion rate. Similarly, the inventors have observed that varying the anode-cathode surface area ratio affects the observed polarization of the cell. Given these observations, anode-cathode ratio enters as an important factor in the observed corrosion rate. In prior art configurations, the anode-cathode area ratio is unity (1). Varying the anode-cathode area ratio from that shown in the prior art has been shown by the inventors to be beneficial to reducing corrosion, with the rate approaching zero as the ratio approaches zero or infinity.

Figure 2:
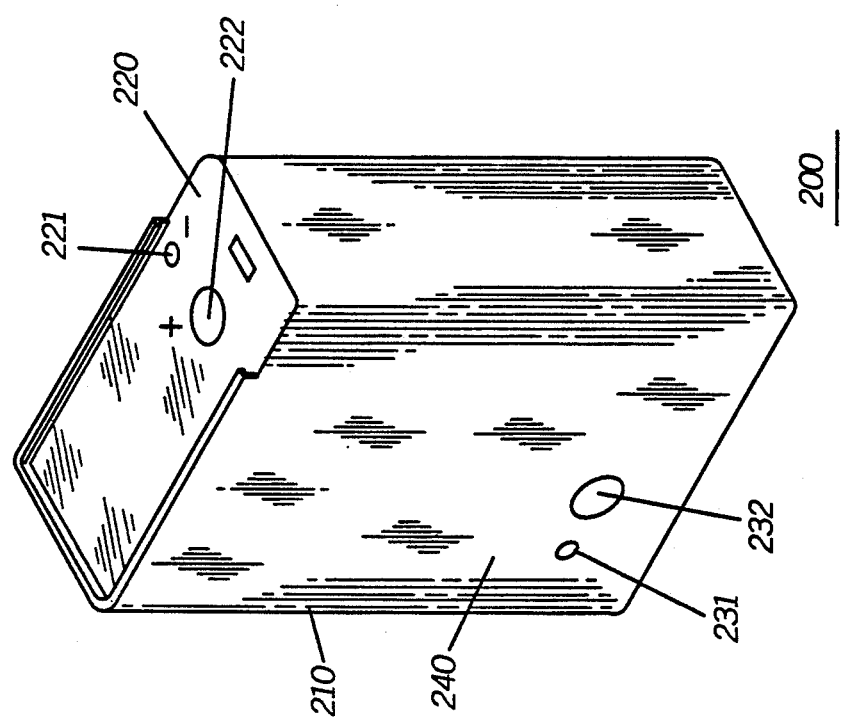
FIG. 2 is an isometric view of a multicell battery package in accordance with the invention.

Turning now to FIG. 2, a perspective view of the preferred embodiment of the present invention is shown as battery 200. Battery 200 includes a housing 210 made of a material having a substantial structural integrity, such as polycarbonate, for example, which is sufficiently durable to protect battery cells which are housed therein. Battery housing 210 includes an external surface 220 on which electrical contacts 221 and 222 are situated. The battery cells (not shown) housed within the housing 210 are connected together in such a manner so as to connect the batteries either in series, or in parallel, or in some combination of series and parallel, and so as to terminate in a positive and a negative terminal. Other electrical components, such as resistors, capacitors, thermistors, thermal switches, diodes, and so forth, may also be conventionally found within the battery housing and connected to the plurality of cells. The positive and negative terminals (not shown) are connected to battery contacts 221 and 222. Battery 200 may also include battery charger contacts 232 and 231 which are employed to interface the battery 200 to a battery charger (not shown). Battery charger contacts 232 and 231 are also connected to the plurality of cells contained within the housing, and may also be protected by making the ratio of areas between the positive and negative contacts greater than one.

In order to better demonstrate the efficacy of the instant invention, the following examples illustrate by way of example, and not by way of limitation, how the corrosion of electrical contacts in a multicell battery package can be reduced.

EXAMPLE 1

Control-both contacts same size

A multicell battery package was made by connecting several battery cells together in series by welding metal tabs to connect the positive terminal of one battery to the negative terminal of another battery. The resulting cell package was wrapped in plastic shrink wrap. The connection for the positive terminal was formed from nickel-silver 770 alloy, and was 0.2×0.2 inches square. The connection for the negative terminal was also formed of the same nickel-silver 770 alloy, and was the same size. The resulting positive/negative contact area ratio was 1/1. The battery pack was subjected to a salt spray test by placing it in a salt spray chamber for 48 hours at 35° C. The salt spray was a 5% solution of salt in distilled water, at a pH of about 6.5 to 7.2. After 48 hours, the battery pack was removed and placed in an ambient environment for 48 hours before terminating the test. The ambient environment was about 25° C. and 60–70% relative humidity (average laboratory conditions).

Figure 3:
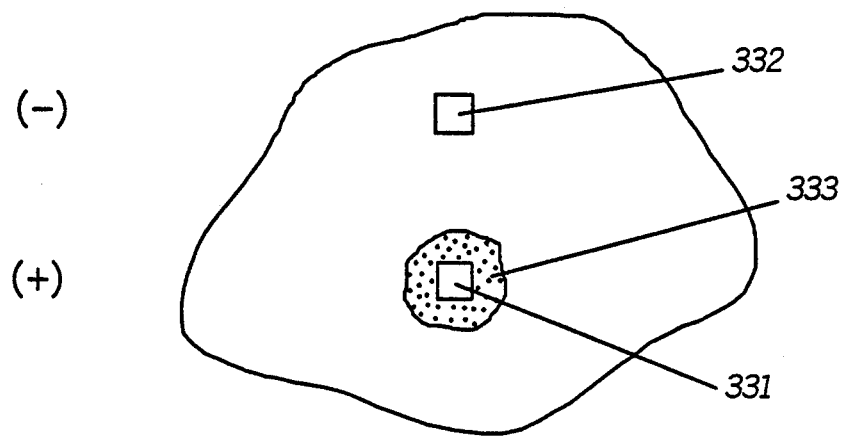
FIG. 3 is a drawing of corrosion products formed after exposing prior art battery contacts to salt spray.

The results of the test revealed that the positive contact 331 formed a great deal of visible corrosion 333 when examined by the unaided eye. The corrosion products were confined to the area around the positive contact (FIG. 3).

EXAMPLE 2

Large positive contact area, small negative contact area

A multicell battery package was made in a manner similar to Example 1. The connection for the positive terminal was formed from nickel-silver 770 alloy, and was 0.4×0.4 inches square. The connection for the negative terminal was also formed of the same nickel-silver 770 alloy, but was formed to be 0.2×0.2 inches square. The resulting positive/negative contact area ratio was 4/1, in accordance with the invention. The battery pack was subjected to the same salt spray test as outlined in Example 1.

Figure 4:
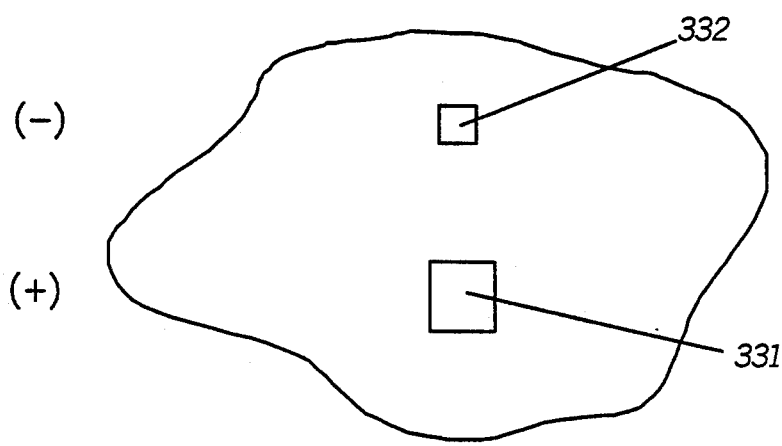
FIG. 4 is a drawing of battery contacts in accordance with the invention after exposure to salt spray.

The results of the test showed that neither the positive 331 nor the negative 332 contact showed any visible corrosion when examined by the unaided eye (FIG. 4).

EXAMPLE 3

Large negative contact area, small positive contact area

A multicell battery package was made in a manner similar to Example 1. The connection for the positive terminal was formed from nickel-silver 770 alloy, and was 0.2×0.2 inches square. The connection for the negative terminal was also formed of the same nickel-silver 770 alloy, but was formed to be 0.4×0.4 inches square. The resulting positive/negative contact area ratio was ¼. The battery pack was subjected to the same salt spray test as outlined in Example 1. The results of the test showed that the positive contact 331 showed a great deal of visible corrosion 333 when examined by the unaided eye. The corrosion products were spread over the entire contact area.

EXAMPLE 4

Large negative contact area, large positive contact area

Figure 5:
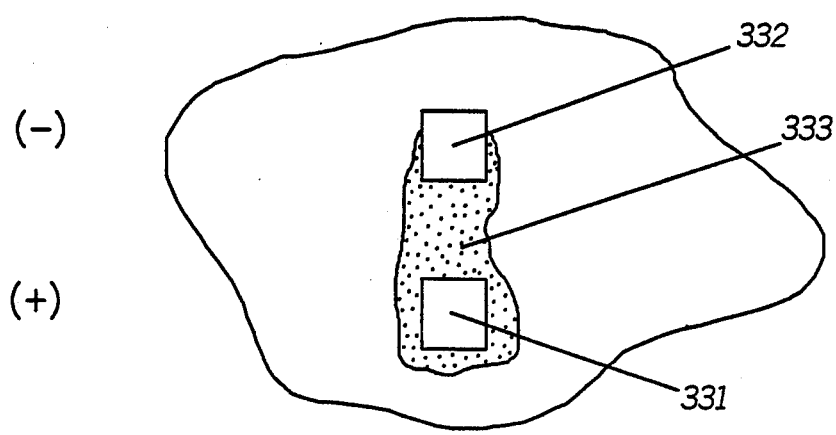
FIG. 5 is a drawing of corrosion products formed after exposing prior art battery contacts to salt spray.

A multicell battery package was made in a manner similar to Example 1. The connection for the positive terminal was formed from nickel-silver 770 alloy, and was 0.4×0.4 inches square. The connection for the negative terminal was also formed of the same nickel-silver 770 alloy, but was formed to be 0.4×0.4 inches square. The resulting positive/negative contact area ratio was 1/1. The battery pack was subjected to the same salt spray test as outlined in Example 1. The results of the test showed that the positive contact 331 showed a great deal of visible corrosion 333 when examined by the unaided eye. The corrosion products were spread over a large area (FIG. 5), but mostly around the positive contact.

The exact mechanism of the corrosion reduction is not totally understood. For example, simultaneous oxidation and reduction reactions may occur on the same surface sites, or the reduced corrosion of the anode may simply be a consequence of the greater area. The latter is thought not to be the case however, as the inventors have noted that at certain anode-cathode ratios, corrosion is completely halted, implying that the reaction rate is certainly being varied. If the corrosion rate remained constant, increasing the electrode size would result in the electrode still corroding, but taking longer to reach total corrosion merely as a consequence of the increased mass. This has been shown to be clearly not the case.

The ratio of the anode-cathode surface area must be greater than unity (greater than 1.0). Example 3 shows that when the area ratio is less than unity, for example 0.25, the corrosion was not reduced. Area ratios of about 4/1 have been found to be optimum, when considering such factors as the amount of area available for the contact, the physical size of the battery package, the level of moisture in the environment, and the degree of polarization in the battery package. Ratios smaller that 4/1 would give results better than a ratio of unity, but not as good as 4/1. Ratios greater than 4/1 gave good corrosion protection, but 4/1 was considered to be an optimum ratio for application to batteries used in portable radios. Increasing the ratio increased the size of the contact dramatically, with minimal reduction in corrosion. A ratio of about 10/1 is as large as one can practically expect to incorporate in a typical battery package. The surface area of the battery terminals or contacts can also be increased by altering the surface of the contact to increase the area. This may be accomplished by toughening the surface. Methods such as texturing, sintering knurling, dimpling, etc. are effective to increase the surface area of a contact, while maintaining the external dimensions at a fixed size.

Figure 6:
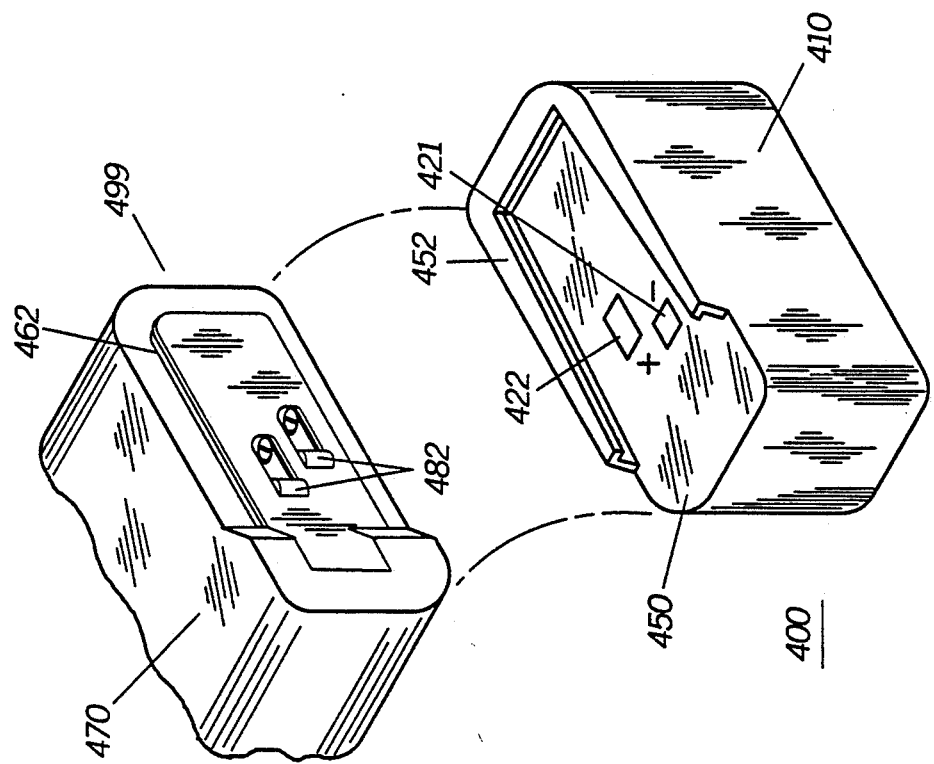
FIG. 6 is an isometric view of a battery power source and an electrical device in accordance with the invention.

Referring now to FIG. 6, a battery power source 400 includes a battery housing 410 and a plurality of electrical cells coupled together and situated within the housing 410. The plurality of cells are ultimately connected to battery electrical contacts 421 and 422. A radio 499 and the battery package 400 are configured to allow interconnection of the two. In order to accomplish this, the forward section 462 on the bottom portion of the radio housing 470, which is of a reduced configuration, is slipped into the opening 450 formed in the rear of ledge 452 positioned on the top of the battery housing 410. Battery terminals 421 and 422 thus become mated to radio supply terminals 482 and operating power is thereby supplied to the radio circuitry in the radio housing portion 470. This configuration is but one of many that have been used and may be further envisioned to allow a radio and a battery package or other electrical apparatus to be detachably interconnected in order to provide electrical contact between the supply terminals and the electrical contacts of the battery.

Figure 7:
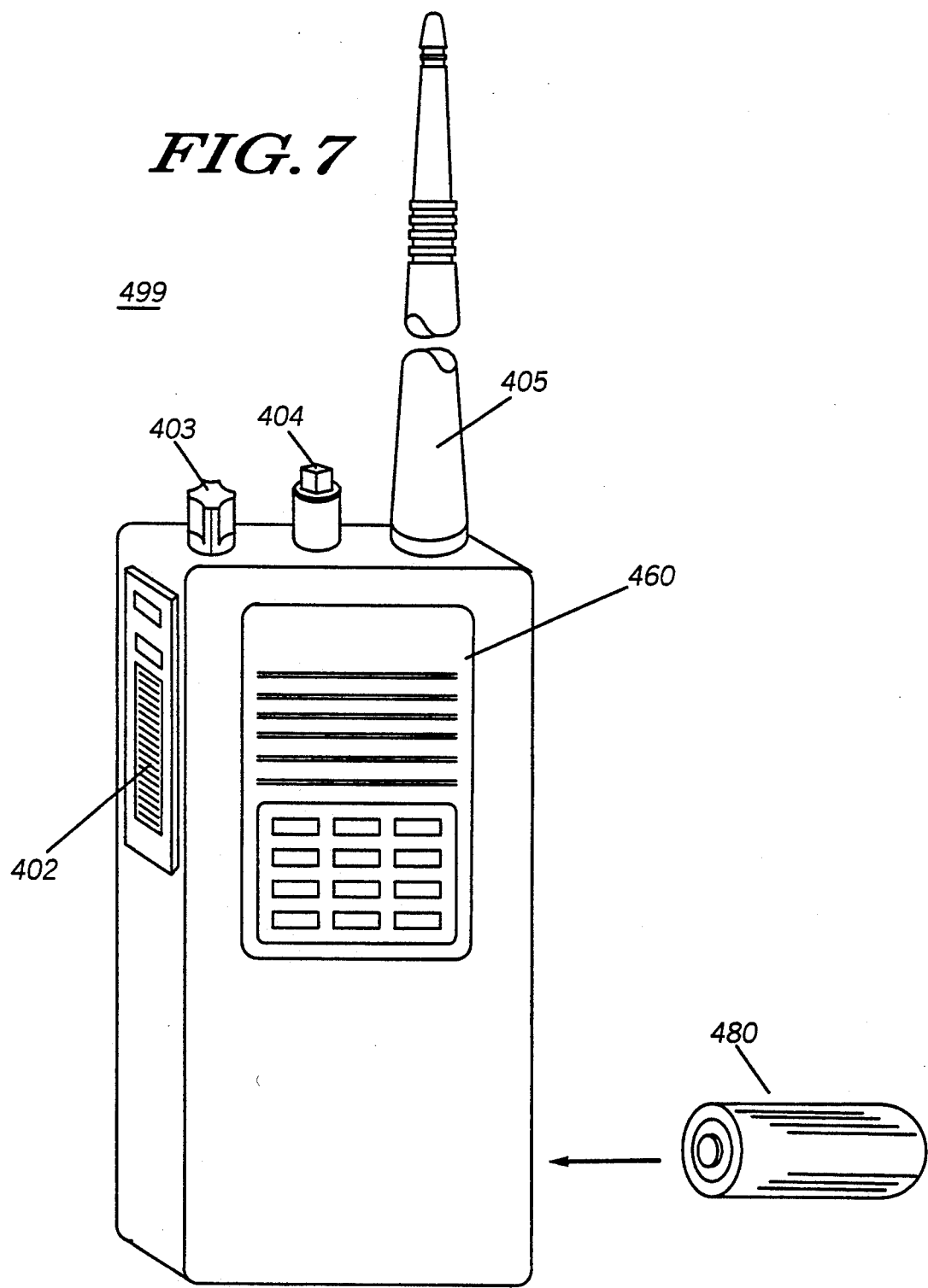
FIG. 7 is an isometric view of a communications device in accordance with the invention.

Referring now to FIG. 7, a typically battery powered communications device is provided, in this case, a two-way portable radio transceiver 499 which has been constructed in accordance with one embodiment of the present invention. The radio 499 includes all the necessary controls, such as push-to-talk switch 402, volume control 403, squelch control 404, antenna 405 and the like, well understood by those skilled in the art. Radio 499 further includes a radio housing portion 460 which contains all of the operating electrical and electronic circuitry and associated components therefore (not shown), including a battery power source 480. Such circuitry is energized by the battery power source 480 when interconnected to a pair of supply terminals (not shown). The supply terminals are configured so as to have an area ratio in accordance with the invention, that is, the area of the positive supply terminal is greater than the area of the negative supply terminal.

While only certain preferred features of the invention have been shown by way of illustration, many modifications and changes will occur to those skilled in the art.

It is, therefore, to be understood that the present claims are to cover all such modifications and changes which may fall within the breadth and scope of the invention.

What is claimed is:

1. A method for controlling corrosion on the terminals of a battery cell used in a corrosive environment, comprising:
   providing a battery cell having positive and negative electrical terminals that are electrically connected, the positive terminal having an exposed surface area between 1.1 and about 10 times greater than the exposed surface area of the negative terminal; and
   placing the battery cell in the corrosive environment, such that the positive and negative terminals are exposed to the corrosive environment.

2. The method as described in claim 1, wherein the step of providing a battery cell comprises providing a battery cell having a positive terminal with an exposed area about 4 times greater than the exposed area of the negative terminal.

3. A method for controlling corrosion on the contacts of a multicell battery package used in a corrosive environment, comprising:
   providing a housing having positive and negative electrical contacts situated on an external surface, the positive electrical contact having an exposed surface area greater than the exposed surface area of the negative electrical contact;
   providing a plurality of battery cells that are situated in the housing and electrically coupled to the positive and negative electrical contacts; and
   placing the multicell battery package in the corrosive environment, such that the positive and negative electrical contacts are exposed to the corrosive environment.

4. The method as described in claim 3, wherein the step of providing a housing comprises providing a positive electrical contact having an exposed area between 1.1 and about 10 times greater than the exposed area of the negative electrical contact.

5. The method as described in claim 4, wherein the step of providing a housing comprises providing a positive electrical contact having an exposed area about 4 times greater than the exposed area of the negative electrical contact.

6. The method as described in claim 3, further comprising a step of providing a second set of electrical contacts in the housing for charging the multicell battery.

7. The method as described in claim 6, wherein the step of providing a second set of electrical contacts for charging the multicell battery comprises providing at least a positive and a negative electrical contact situated on an external surface of the housing and coupled to the plurality of battery cells, the positive electrical contact having an exposed surface area greater than the exposed surface area of the negative electrical contact.

8. A method for controlling corrosion on the battery terminals of a battery-powered electrical device that is used in corrosive environments, comprising:
   providing a first housing having the electrical device therein;
   providing a battery power source having a least a positive and a negative terminal, the positive terminal having an exposed surface area between 1.1 and about 10 times greater than the exposed surface area of the negative terminal;
   placing the battery power source in the first housing and electrically coupling it to the electrical device; and
   placing the battery power source in the corrosive environment, such that the positive and negative terminals are exposed to the corrosive environment.

9. The methods as described in claim 8, wherein the step of providing a battery power source comprises providing a positive terminal having an exposed area about 4 times greater than the exposed area of the negative terminal.

10. A method for controlling corrosion on the battery terminals of a battery-powered electrical device that is used in corrosive environments, comprising:
    providing a first housing having the electrical device therein;
    providing a second housing having a battery power source situated therein and coupled to positive and negative electrical terminals situated on an external surface of the housing, the positive electrical terminal having an exposed surface area greater than the exposed surface area of the negative electrical terminal, the first and second housings having means for detachably connecting the electrical device and the battery power source by means of the terminals;
    electrically coupling the electrical device to the battery power source; and
    placing the electrical device and the battery power source in the corrosive environment, such that the positive and negative electrical terminals are exposed to the corrosive environment.

11. A method for controlling corrosion on the battery terminals of a battery-powered communication device that is used in corrosive environments, comprising:
    providing a communications device having a first housing with electrically energized circuitry and components therein, operating power for the device supplied through a set of included supply terminals;
    providing a battery package comprising:
      a battery housing having an external surface;
      a plurality of cells electrically coupled together and situated in the housing; and
      at least one set of positive and negative electrical contacts situated on the external surface of the battery housing and coupled to the plurality of cells, the positive electrical contact having an exposed surface area between 1.1 and about 10 times greater than the exposed surface area of the negative electrical contact;
    interconnecting the communications device to the battery package by means of the set included supply terminals and the positive and negative electrical contacts; and
    placing the communications device and the battery package in the corrosive environment, such that the positive and negative electrical contacts are exposed to the corrosive environment.

* * * * *

UNITED STATES PATENT AND TRADEMARK OFFICE
CERTIFICATE OF CORRECTION

PATENT NO. : 5,328,780
DATED : July 12, 1994
INVENTOR(S) : Venus D. Desai

It is certified that error appears in the above-indentified patent and that said Letters Patent is hereby corrected as shown below:

Column 8, claim 11, line 58, between "set" and "included" insert -- of --.

Signed and Sealed this

Eighth Day of November, 1994

Attest:

BRUCE LEHMAN

*Attesting Officer*   *Commissioner of Patents and Trademarks*